(12) United States Patent
Tipton et al.

(10) Patent No.: US 6,413,427 B2
(45) Date of Patent: Jul. 2, 2002

(54) NITROGEN REDUCTION WASTEWATER TREATMENT SYSTEM

(75) Inventors: Gary A. Tipton, Houston, TX (US); Douglas E. Fessel, Waterville, MN (US)

(73) Assignee: Ecokasa Incorporated, Houston, TX (US)

( * ) Notice: Subject to any disclaimer, the term of this patent is extended or adjusted under 35 U.S.C. 154(b) by 0 days.

(21) Appl. No.: 09/820,151

(22) Filed: Mar. 28, 2001

Related U.S. Application Data
(60) Provisional application No. 60/193,145, filed on Mar. 29, 2000.

(51) Int. Cl.[7] .................................................. C02F 3/30
(52) U.S. Cl. .................. 210/605; 210/617; 210/621; 210/630; 210/151; 210/195.1; 210/903
(58) Field of Search ................. 210/605, 617, 210/621, 622, 630, 631, 150, 151, 195.1, 202, 220, 258, 259, 903

(56) References Cited

U.S. PATENT DOCUMENTS

| | | | |
|---|---|---|---|
| 3,260,366 A | 7/1966 | Duff et al. .................... 210/80 |
| 3,773,660 A | 11/1973 | Hopwood ...................... 210/8 |
| 3,850,801 A | 11/1974 | Pearson ........................ 210/86 |
| 3,869,381 A | 3/1975 | Graveland et al. ............ 210/20 |
| 4,008,159 A | 2/1977 | Besik ............................ 210/7 |
| 4,065,391 A | 12/1977 | Farabaugh ................... 210/274 |
| 4,202,774 A | 5/1980 | Kos ............................. 210/274 |
| 4,720,347 A | 1/1988 | Berne ......................... 210/792 |
| 4,895,645 A | 1/1990 | Zorich, Jr. .................... 210/98 |
| 4,931,183 A | 6/1990 | Klein et al. .................. 210/614 |
| 4,933,076 A | 6/1990 | Oshima et al. ............. 210/151 |
| 5,207,905 A | 5/1993 | O'Brien et al. ............. 210/274 |
| 5,484,524 A | 1/1996 | MacLaren et al. .......... 210/151 |
| 5,578,202 A | 11/1996 | Hirane ........................ 210/150 |
| 5,582,719 A | 12/1996 | Nagano ..................... 210/139 |
| 5,667,670 A | 9/1997 | Drewery ..................... 210/86 |
| 5,843,305 A | 12/1998 | Kim et al. .................. 210/151 |
| 6,103,109 A | 8/2000 | Noyes et al. ................ 210/151 |

OTHER PUBLICATIONS

*Wasterwater Engineering Treatment, Disposal, and Reuse, Third Edition*; Metcalf & Eddy, Inc.; pp. 714–717.

*Primary Examiner*—Christopher Upton
(74) *Attorney, Agent, or Firm*—Kinney & Lange, P.A.

(57) ABSTRACT

A compact nitrogen reduction wastewater treatment system for treating a waste liquid, the system comprising a single tank. The tank includes an inlet, an aerobic treatment compartment, an anoxic treatment compartment, a suspended micromedia compartment, an aerator, and a tank outlet. The aerobic treatment compartment includes aerobic treatment bacteria and is in fluid communication with the tank inlet. The anoxic treatment compartment is laterally disposed relative to, and in fluid communication with, the aerobic treatment compartment. The suspended micromedia compartment includes separating media. It is positioned laterally relative to, and is in fluid communication with, the anoxic treatment compartment. The suspended micromedia compartment is also laterally disposed relative to, and in fluid communication with, the aerobic treatment compartment. The aerator injects air bubbles into the suspended micromedia compartment, thereby causing at least some of the waste liquid to recirculate to the aerobic treatment compartment.

15 Claims, 9 Drawing Sheets

NITROGEN REDUCTION WASTEWATER TREATMENT SYSTEM

CROSS-REFERENCE TO RELATED APPLICATION(S)

This application claims the priority benefits of U.S. Provisional Patent Application Serial No. 60/193,145, filed Mar. 29, 2000.

BACKGROUND OF THE INVENTION

This invention relates generally to the treatment of non-toxic wastewater, including water-borne waste material from residential, commercial and other sources, and particularly to an improved system for nitrogen reduction.

Wastewater treated by conventional wastewater treatment systems contains soluble, partially soluble and insoluble material as well as contaminates. Materials in the wastewater may be decomposable, partially decomposable or not decomposable. Decomposable and partially decomposable materials are referred to as biodegradable; that is, the material may be biologically broken down, or stabilized by bacterial action. Wastewater treatment systems are designed to provide controlled decomposition of wastes to reduce pollution, health hazards and offensive odors.

Decomposable material is stabilized in wastewater treatment systems by bacteria, protozoa, and other microorganisms. Bacterial consumption of material, creating energy and reproducing bacterial cells, is the foundation of activated sludge wastewater treatment. Conventional wastewater treatment systems may include pretreatment, primary treatment, secondary treatment, and advanced treatment.

Pretreatment includes screening, comminuting (mechanical cleaning of screens by shredding solids to a size which can pass through screen openings), degritting, and grease and scum removal.

Primary treatment includes removal of suspended solids from wastewater by clarification and skimming. This typically involves a tank or channel and the following steps: reducing flow velocity, settling heavier solids, and skimming relatively light solids. Primary treatment may include anaerobic digestion processes, aerobic digestion processes, or a combination thereof. Primary treatment systems typically include sludge collection mechanisms, sludge suction devices, grit removal devices, and sludge dewatering devices to reduce the volume of sludge to be disposed.

Secondary treatment systems are typically aerobic systems including an aeration phase and a clarification phase. Secondary treatment systems typically include an aeration tank, an air distribution system, a clarifier, sludge collection mechanisms, and sludge removing devices.

Advanced treatment includes further removal of suspended and dissolved organic solids by means including filtration and removal of pathogens and chloroforms by oxidation, chlorination or heating, precipitation of minerals, adsorption, or other methods.

In the activated sludge process of primary or secondary treatment, microorganisms are contained in an activated sludge and mixed with incoming wastewater; the wastewater providing food for the microorganisms. Such mixing is accomplished in an aeration tank or channel. In the aerobic activated sludge process, oxygen is intimately mixed with the activated sludge and the wastewater. The microorganisms convert suspended organic solids into energy, carbon dioxide, water, and additional microorganism cells. The aerobic activated sludge process therefore typically includes mixing of wastewater, activated sludge, and oxygen in an aeration tank; consumption of suspended organic solids by bacteria; settling of activated sludge in the clarifier; returning the activated sludge to the aeration tank for further treatment; removing purified liquor from the clarifier; and removing and disposing of the final, inert sludge.

In the further process of advanced treatment, the purified liquor from the clarifier is typically filtered. The filtered liquor is refined through chlorination, oxidation, or heating.

This invention relates to a system for nitrogen reduction in wastewater. Nitrogen is a critical element required for protein synthesis and is essential to life. When living things die or excrete waste products, nitrogen that was tied to complex organic molecules is converted to ammonia by bacteria and fungi. In this state, the ammonia exerts a significant and undesirable oxygen demand on the environment as it enters lakes, streams and other bodies of water.

In conventional anaerobic septic systems, the ammonia present in the influent, due to the lack of oxygen necessary for chemical conversion of the ammonia to harmless forms of nitrogen and oxygen, is passed through the system to the drain or discharge field with the potential to reach a body of water untreated.

Wastewater systems utilizing an aerobic process undergo nitrification, or the conversion of ammonia to nitrites and the further conversion of nitrites and nitrates. This process is accomplished by two bacteria genera—Nitrosomonas and Nitrobacter. Nitrosomonas oxidizes ammonia to produce nitrite. Nitrobacter converts some of the produced nitrite to nitrate. These equations for the reactions that occur can be written as follows:

Nitrosomonas equation:

$$55NH_4^+ + 76O_2 + 109HCO_3^- \rightarrow C_5H_7O_2N + 54NO_2^- + 57H_2O + 104H_2CO_3$$

Nitrobacter equation:

$$400NO_2^- + NH_4^+ + 4H_2CO_3 + HCO_3^- + 195O_2 \rightarrow C_5H_7O_2N + 3H_2O + 400NO_3^-$$

In either the ammonia ($NH_4^+$) or nitrate ($NO_3^-$) form, damage to the environment or human health can result. Nitrogen is one of the nutrients required for growth. Excessive amounts can result in algae blooms and other problems. This is especially important where effluent is discharged to lakes and streams. The result is called eutrophication.

As discussed, conventional systems leave the nitrogen in an unacceptable state. It is important to convert the ammonia and nitrate to a form that can be released to the environment without causing harm. One treatment process is nitrification/denitrification of the wastewater by biological processes and subsequent release of gaseous nitrous oxide and molecular nitrogen into the atmosphere.

Once the ammonia has been converted to nitrates through nitrification, denitrification can be introduced to convert the nitrogen in the nitrates to an acceptable form. Facultative bacteria under anoxic conditions carry out denitrification. It is important that the oxygen level be reduced. Dissolved oxygen is an inhibitor to denitrification reactions. The reactions for nitrate reduction can be written as follows:

$NO_3^- \rightarrow NO_2^- \rightarrow NO^- \rightarrow N_2O \rightarrow N_2$ with oxygen being released to the wastewater.

Bacteria required for the conversion of nitrogen compounds to nitrogen are sensitive organisms and extremely susceptible to a wide variety of inhibitors. A variety of organic and inorganic agents can inhibit the growth and action of these organisms, such as high concentrations of ammonia or nitrous acid. The effect of pH is also significant. A narrow range of between about pH 7.5 to about pH 8.6 is optimal. Temperature, either too high or too low, also has a significant effect on the growth of the bacteria and their ability to convert nitrogen compounds to nitrogen. A temperature range of about 60° F. to about 100° F. is ideal. Dissolved oxygen must be present for nitrification to occur and absent for the denitrification process. In both phases organic materials must be available to provide energy to the microorganisms for nitrogen compound conversion and for cell growth.

Conventional biological systems generally use multiple stages in removed tanks to achieve conversion of nitrogen to an acceptable form. The first stage is a pretreatment system for removal of solids and pretreatment of the wastewater. The second stage is an aerobic process for nitrification. The third stage is a separate biological system using methanol as the carbon source for denitrification. The Bardenpho Process, for example, utilizes the carbon from the untreated wastewater and from endogenous decay by returning the aerobically treated wastewater to the initial anaerobic zone. The partially treated effluent is then passed through another anoxic denitrification zone and a final aerobic zone and then through a secondary clarifier. The steps are performed in separate vessels.

In an "oxidation ditch process," mixed liquor flows around a loop-type channel. An aerobic zone is established immediately downstream of an aerator and an anoxic zone is created upstream of the aerator. The influent wastewater is injected at the upstream limit of the anoxic zone. This allows some of the wastewater carbon to be used for denitrification. The effluent of the system is taken at the end of the aerobic zone and transported to a clarifier. A method for the removal of the nitrous oxide and nitrogen gas may be added at this stage. This process is completed in a single circular containment vessel, on a scale that is feasible only for very large applications, such as for municipalities or communities.

Most biological nitrification/denitrification systems employ some modification of the described systems. They may incorporate suspended-growth, attached-growth, complete-mix, and plug-flow reactors in the process. Each process, in general, relies on anaerobic-aerobic-anaerobic flow to achieve nitrogen removal.

Current technology is generally practiced in relatively large plants providing wastewater treatment for communities. Many plants provide a high amount of process control. Conventional design of such plants, however, requires the use of a large number of mechanical subsystems including pumps, blowers, gears, chains, and associated mechanical elements. The large quantity of mechanical parts makes such conventional systems expensive to construct and maintain, as well as difficult to operate and infeasible for small applications.

U.S. Pat. No. 6,103,109 to Noyes et al., which is fully incorporated herein by reference, solves many of the problems of conventional designs. However, the vertical arrangement of the fixed media zone above the suspended micromedia compartment allows cellulose from dead microorganisms to fall into, and therefore clog, the pores of the suspended micromedia compartment. Therefore, a need exists for a wastewater treatment system in which the different treatment compartments are arranged so that clogging of the suspended micromedia compartment is minimized.

BRIEF SUMMARY OF THE INVENTION

The present invention is a wastewater treatment system comprising a simple, compact, and economical design in a single tank with an improved flow schematic. It provides a mechanism for the reduction of nitrogen in effluent wastewater by combining several processes into a simple system operated by one air compressor. A key component of the invention is the combining of several process stages into one unit or tank. The result is a smaller, more efficient system able to meet stringent discharge requirements.

A preferred embodiment of the tank of the present invention comprises three compartments: an aerobic treatment compartment for nitrification, an anoxic treatment compartment for denitrification, and a suspended micromedia compartment. It also includes either a fourth compartment which serves as a discharge compartment, or a discharge well. The compartments are laterally adjacent to each other within the tank, so that solid particles that settle out of the wastewater in one compartment do not flow into, and thereby cause clogging in, another compartment.

The compressor or air pump used to provide oxygen for the aerobic process also provides the pumping action required to circulate the wastewater through the system and provide for nitrogen stripping in the final phase of treatment. The same compressor also provides the negative pressure required to facilitate the reduction of dissolved oxygen levels in the anoxic zone.

DETAILED DESCRIPTION

Figure 1:
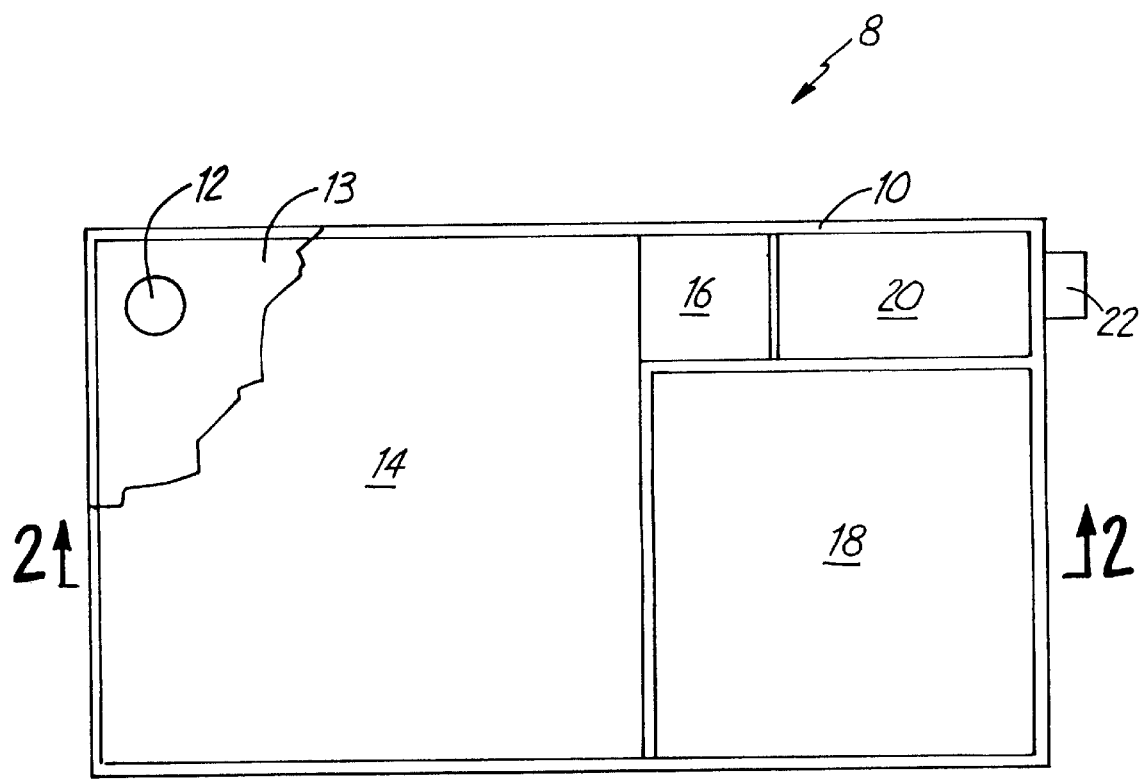
FIG. 1 is a top view of a preferred embodiment of the wastewater treatment system of the present invention.

FIG. 1 is a top view of a preferred embodiment of the wastewater treatment system of the present invention. Wastewater treatment system 8 is preferably contained in a single tank 10 which includes inlet 12 in a cover 13, aerobic treatment compartment 14, anoxic treatment compartment 16, suspended micromedia compartment 18, discharge compartment 20, and outlet 22. Cover 13 is broken away so that the divisions between the individual compartments can be seen. Generally, waste liquids enter tank 10 through inlet 12 in cover 13. The waste liquid flows down through aerobic treatment compartment 14 and into anoxic compartment 16. The waste liquid flows up through anoxic compartment 16 and into suspended micromedia compartment 18. From suspended micromedia compartment 18, most of the waste liquid flows up compartment 18 and is recirculated back to aerobic treatment compartment 14. A minor portion of the waste liquid in compartment 18 flows downward and into discharge compartment 20. The treated waste liquid can then be removed from discharge compartment 20 through outlet 22.

In the preferred embodiment shown, tank 10 is generally rectangular in shape. However, the principles demonstrated herein may be accomplished by a wastewater treatment system 8 of various shapes. The dimensions of system 8 are highly variable, depending on the influent loading and flow rate, the amount and type of media used, and other factors. In an example of a preferred embodiment, tank 10 measures about 7 feet long, 4 feet deep, and 7 feet high; it includes aerobic treatment compartment 14, which is typically the largest compartment and which measures about 4 feet long, 4 feet deep, and 7 feet high; anoxic compartment 16, which measures about 1 foot long, 1 foot deep, and 7 feet high; suspended micromedia compartment 18, which measures about 3 feet long, 3 feet deep, and 7 feet high; and discharge compartment 20, which measures about 2 feet long, 1 foot deep, and 7 feet high. A tank 10 of this size can be expected to treat about 1500 gallons of wastewater per day. The residence time in tank 10 for full treatment is about 12 hours.

Figure 2:
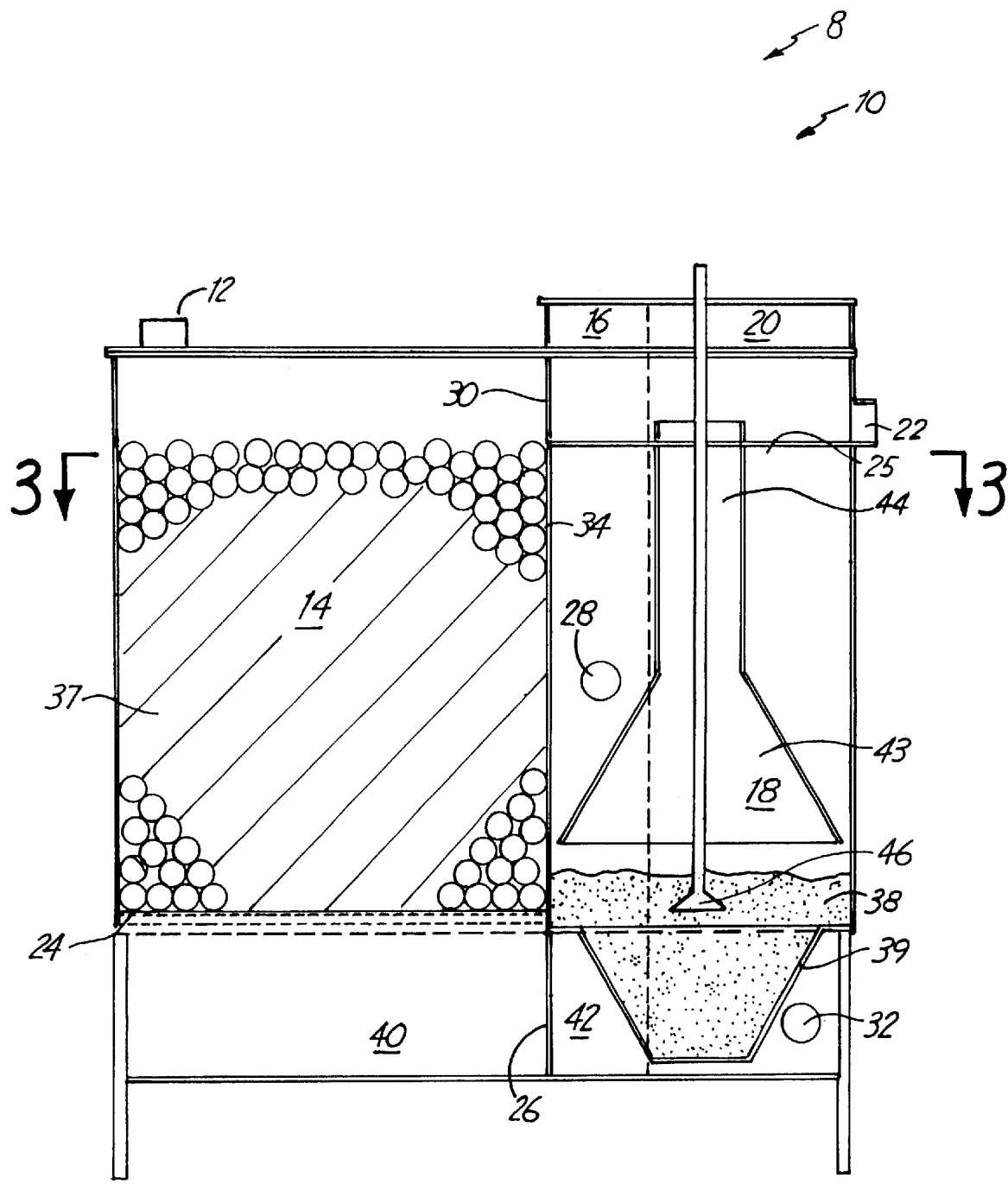
FIG. 2 is a sectional elevation view of the preferred embodiment of FIG. 1, taken along line 2—2 of FIG. 1.
Figure 3:
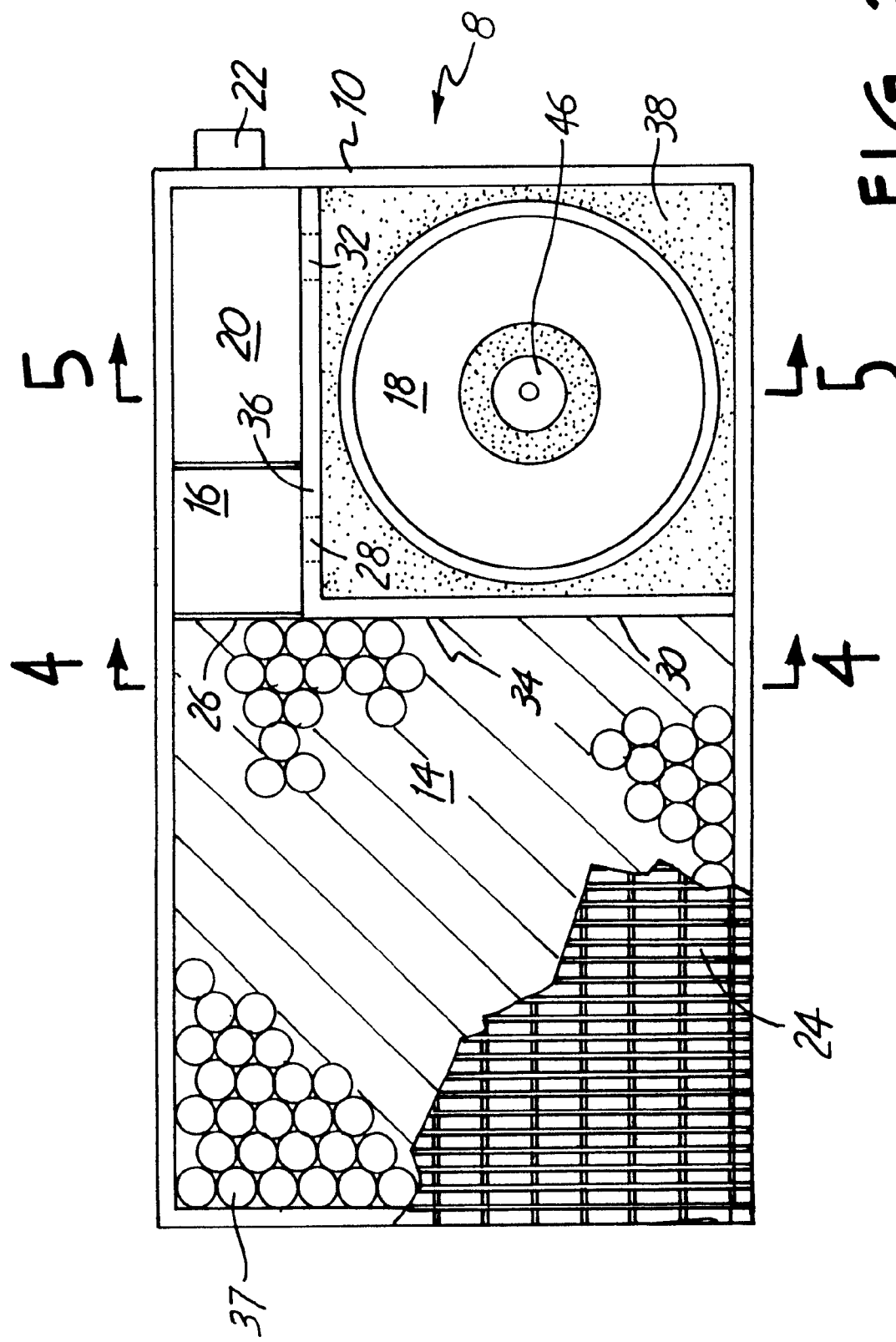
FIG. 3 is a top sectional view of a preferred embodiment, taken along line 3—3 of FIG. 2.

FIG. 2 is a sectional elevation view of the preferred embodiment of FIG. 1, taken along line 2—2 of FIG. 1. FIG. 3 is a top sectional view of a preferred embodiment, taken along line 3—3 of FIG. 2. FIGS. 2 and 3 should be reference together for the following discussion to illustrate the orientation of the structural features discussed. FIGS. 2 and 3 show structural features of tank 10, including raised floor 24 of aerobic compartment 14; tray 25 of suspended micromedia compartment 18; opening 26 between aerobic compartment 14 and anoxic compartment 16; aperture 28 between anoxic compartment 16 and suspended micromedia compartment 18; opening 30 between suspended micromedia compartment 18 and aerobic compartment 14; aperture 32 between suspended micromedia compartment 18 and discharge compartment 20; wall 34 separating aerobic compartment 14 from anoxic compartment 16 and suspended micromedia compartment 18; wall 36 separating suspended micromedia compartment 18 from anoxic compartment 16 and discharge compartment 20; separating media 38 in suspended micromedia compartment 18, supported by media retaining mechanism 39; underdrain zone 40 in aerobic treatment compartment 14; underdrain zone 42 in suspended micromedia compartment 18; and inverted cone 43, chimney 44, and diffuser 46 in suspended micromedia compartment 18.

The functions of each compartment of tank 10 will be discussed with reference to this figure, and the flow of waste liquids through tank 10 will be discussed with reference to later figures. Influent wastewater is introduced into aerobic compartment 14 of tank 10 through inlet 12. Wastewater may encompass any type of waste containing waste solids and waste liquids, including transportable liquid waste and sewerage waste. Waste liquids entering inlet 12 percolate downward through fixed media 37 in aerobic treatment compartment 14. Fixed media 37 are supported on a liquid permeable floor 24. In a preferred embodiment, floor 24 comprises a media retaining material such as 2-inch thick PVC grating.

Fixed media 37 comprise substantially rigid material having sufficient voids to allow vertical and lateral flow therethrough. Fixed media 37 may comprise a variety of shapes and materials and preferably has a relatively large amount of surface area to support the growth of aerobic bacteria thereon. Suitable media 37 include plastic wiffle balls.

The biological process in aerobic treatment compartment 14 in a preferred embodiment is an attached-growth process. In this process, aerobic, facultative and anoxic microorganisms co-exist as new growth reduces the available oxygen. Nitrification is the primary reaction in this chamber, with some denitrification.

As the wastewater flows through aerobic treatment compartment 14, the wastewater contacts the aerobic treatment bacteria, which act to decompose the solids found in the wastewater. After percolating through floor 24 of aerobic treatment compartment 14 and into underdrain zone 40, the wastewater flows into anoxic compartment 16 through opening 26 in wall 34.

Anoxic compartment 16 has no oxygen supply and becomes anoxic as the oxygen is dissipated or used by the microorganisms. It is in this chamber that nitrates are converted to nitrites, nitric oxide, nitrous oxide and nitrogen gas by facultative and anoxic microorganisms. The size of anoxic compartment 16 will vary to achieve the retention time necessary for anoxic conditions to exist and for denitrification to occur.

A vacuum may be applied in anoxic compartment 16 to assist in removing oxygen and achieving an anoxic state. Operation may be simplified if the vacuum is provided by utilizing the inlet side of an aeration compressor as the source of the vacuum; in this case, a single air compressor is used for aeration, air sparging, recirculation, and supplying a vacuum. An external vacuum pump can be used if a larger vacuum is required.

The mixed influent from aerobic treatment compartment 14 provides the carbon material necessary for the system energy and cell growth required to sustain the denitrification process in anoxic compartment 16. Unlike in prior art processes, the influent carbon is not completely removed by a first pass through aerobic treatment compartment 14. Because the method of the current invention requires about 6–8 cycles for full treatment, some carbon passes unprocessed through aerobic treatment compartment 14 and into anoxic compartment 16, thereby providing nutrients for the facultative organisms therein.

The wastewater flows from anoxic compartment 16 through aperture 28 to suspended micromedia compartment 18. Suspended micromedia compartment 18 includes separating media 38. Suitable separating media 38 include sand, glass beads, and other particles, most preferably with diameters of about 50 microns. Separating media 38 are held by media retaining mechanism 39, which may be, for example, a screen or strainer basket. Media retaining mechanism 39 retains separating media 38 while allowing the passage of at least a portion of the waste liquids.

Suspended micromedia compartment 18 contains a means for aerating, as taught in U.S. Pat. No. 6,102,109, to Noyes et al., which is fully incorporated by reference. An air pump, compressor, or other aerator injects air bubbles through diffuser 46 and into suspended micromedia compartment 18, thereby agitating separating media 38. While the preferred embodiment uses a single compressor and a single diffuser, it is understood that a large tank 10 may require a plurality of compressors and/or diffusers.

As the air bubbles rise, they are collected by inverted cone 43. Water is displaced by the injected air bubbles and forced up chimney 44. The rising water cascades out the top of chimney 44 and is collected by return tray 25. Most of the wastewater is carried from suspended micromedia compartment 18 upward through chimney 44 and onto tray 25, which diverts the water back to aerobic treatment compartment 14. In addition to causing the recirculation of water to aerobic treatment compartment 14, the aeration in suspended micromedia compartment 18 achieves the high dissolved oxygen content necessary to support the aerobic process in aerobic treatment compartment 14.

The wastewater is returned from suspended micromedia compartment 18 to aerobic treatment compartment 14 for continued treatment to insure that any untreated organic matter is processed. In aerobic treatment compartment 14, the returned wastewater traveling through opening 30 is mixed with incoming wastewater introduced through inlet 12. The incoming wastewater provides the carbon necessary to sustain the bacteria in anoxic compartment 16, without the need to add methane gas or other nutrients for the bacteria. The aeration process also provides the air sparging necessary to remove the nitrous oxide and nitrogen gas entrained in the treated water. The incoming air can be heated to maintain a temperature range that facilitates the process.

From suspended micromedia compartment 18, most of the wastewater is returned to aerobic compartment 14 through opening 30, while a small portion of the wastewater filters through separating media 38 and flows to discharge compartment 20 through aperture 32. In a preferred embodiment, the proportion of water flowing to aerobic compartment 14 to the proportion flowing to discharge compartment 20 is about 8:1.

Discharge compartment 20 acts as a level control for the system and as a pump chamber for discharging the treated effluent. From discharge compartment 20, the treated wastewater may be removed through outlet 22. When discharge compartment 20 is not required, as with a gravity distribution system, it can be eliminated without detrimental effect to the function of system 8.

In an alternative embodiment, a tank 10 may include only an anoxic treatment zone 16, a suspended micromedia zone 18, and a discharge compartment 20. Such a tank 10 may be used as an insert into a larger and separate aerobic treatment tank. This modification will facilitate construction and installation of system 8 by reducing the size of the new components needed.

Figure 4:
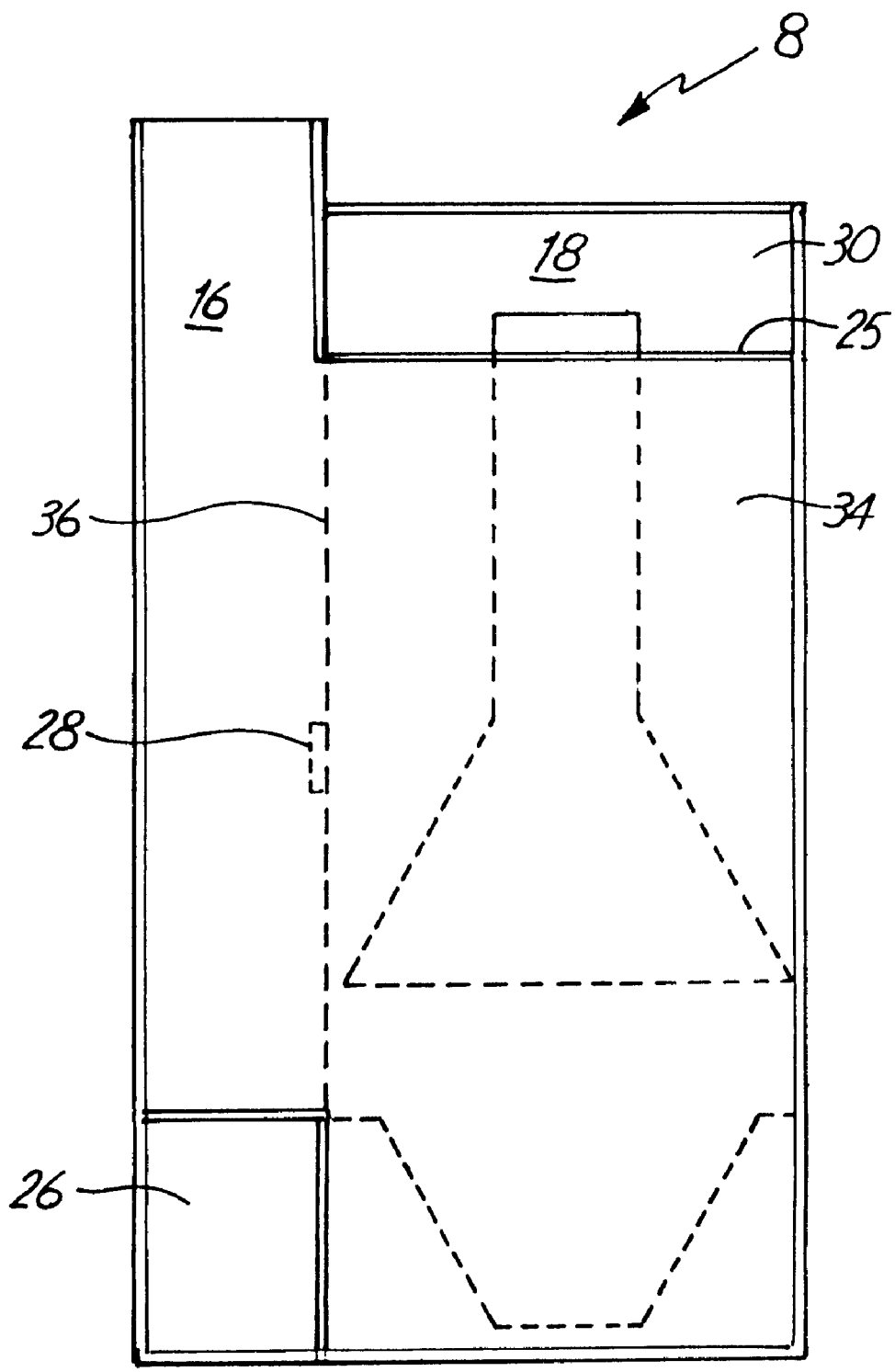
FIG. 4 is a sectional elevation view of a preferred embodiment, taken along line 4—4 of FIG. 3.
Figure 5:
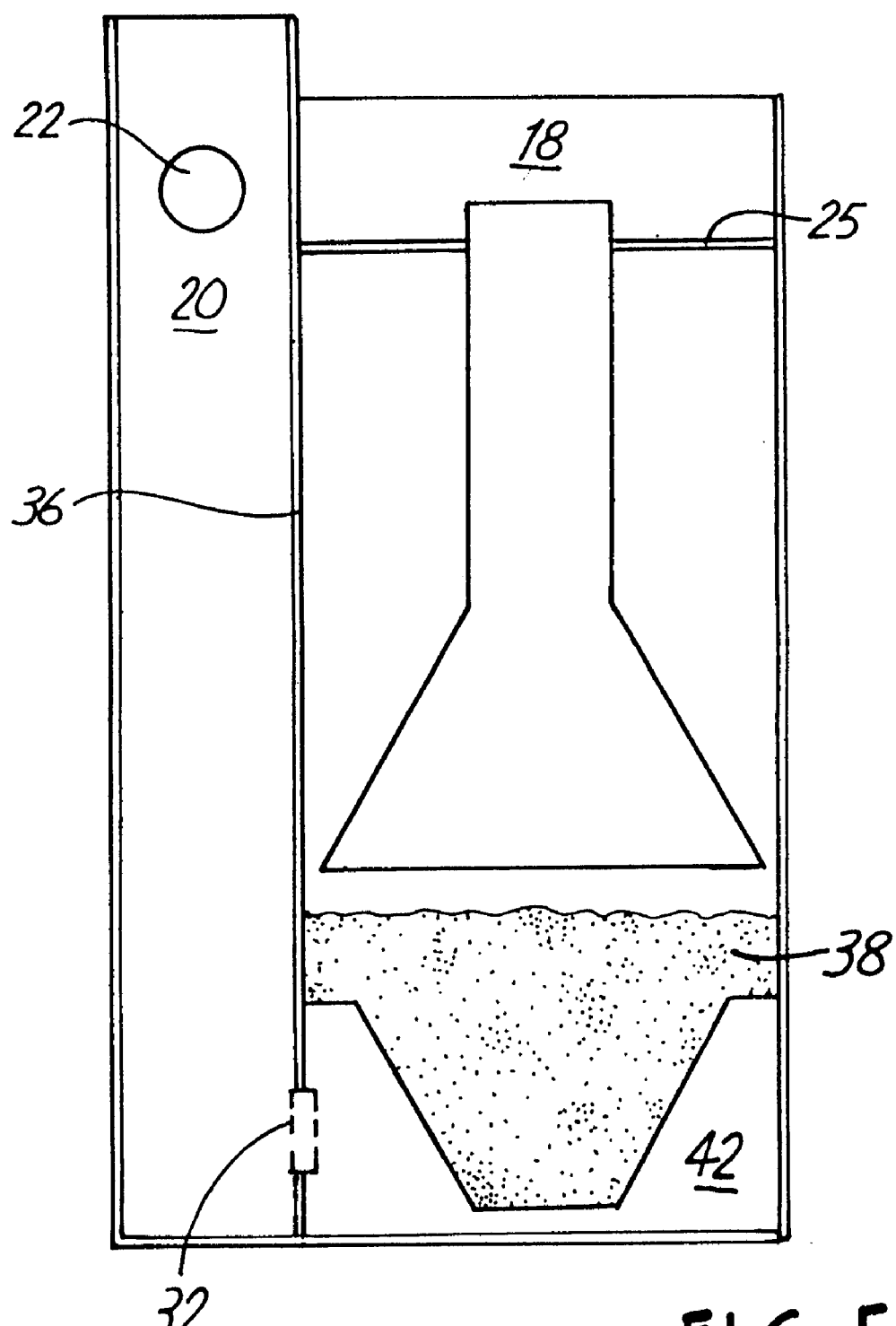
FIG. 5 is a sectional elevation view of a preferred embodiment, taken along line 5—5 of FIG. 3.

FIGS. 2, 3, 4, and 5 will be referenced for an explanation of the water flow pattern in tank 10. FIG. 4 is a sectional elevation view of a preferred embodiment, taken along line 4—4 of FIG. 3. FIG. 5 is a sectional elevation view of a preferred embodiment, taken along line 5—5 of FIG. 3.

As can be seen in FIG. 2, water entering inlet 12 percolates downward through aerobic treatment compartment 14, through floor 24, and to underdrain zone 40. As best seen in FIG. 4, underdrain zone 40 fluidly communicates with anoxic treatment compartment 16 via opening 26 in wall 34. As the water level rises in aerobic treatment compartment 14, it also rises in anoxic compartment 16. Once the water in anoxic compartment 16 rises to the level of aperture 28 in wall 36, it flows through aperture 28 into suspended micromedia compartment 18. Because aperture 28 is disposed at an elevated height compared to underdrain zone 40, heavier solid matter, such as debris and excess biomass, settles at the bottom of underdrain zone 40 and does not flow with the water, in appreciable amounts, into anoxic compartment 16.

Aperture 28 may be disposed higher on wall 36 than illustrated if more capacity in anoxic compartment 16 is desired.

A maintenance door may be disposed on tank 10 to allow access to underdrain zone 40 for ease of removal of the solid matter. Alternatively, the solids and sludge accumulated in underdrain zone 40 may be manually removed periodically by removing the top of tank 10 and floor 24, and pumping the solids and sludge from underdrain zone 40 using methods and apparatuses known in the art, such as pumping by a sewage pump truck. Because underdrain zone 40 accumulates and allows for the removal of undigested materials, it reduces the load on, and prevents clogging of, separating media 38.

Another advantage of separating suspended micromedia compartment 18 laterally from aerobic treatment compartment 14 is that access to separating media 38 is not restricted by the media in aerobic treatment compartment 14. This is important if separating media 38 must be replaced or manually fluidized.

As water flows from anoxic compartment 16 to suspended media compartment 18, it flows downward into separating media 38. Aeration by diffuser 46 in separating media 38 causes a major portion of the water to flow up inverted cone 43 and chimney 44. From the top of chimney 44, the water is collected by tray 25. From tray 25, the water flows back into aerobic treatment compartment 14 through opening 30 in wall 34. Tray 25 may be inclined to facilitate the flow of water from tray 25 into aerobic treatment compartment 14. In aerobic treatment compartment 14, influent coming through inlet 12 is mixed with the recirculated, aerated water, providing carbon necessary for cell growth and energy for the conversion of nitrogen compounds. Both aerobic and anoxic processes require carbon but in conventional systems, the carbon has been removed by the aerobic phase and must be supplied by external sources. This system eliminates the need for an external carbon source. The continuous mixing and recirculation of the treated wastewater with the incoming wastewater also acts as a buffer to changes in the pH.

Reference is now made to FIG. 5. Some of the wastewater within suspended micromedia compartment 18 is not carried to aerobic treatment compartment 14, but instead percolates downward through separating media 38, which clarifies the water, and into underdrain zone 42. Underdrain zone 42 is in fluid communication with discharge compartment 20 via aperture 32 in wall 36. The clarified water then fills discharge compartment 20 and is removed through outlet 22.

Figure 6:
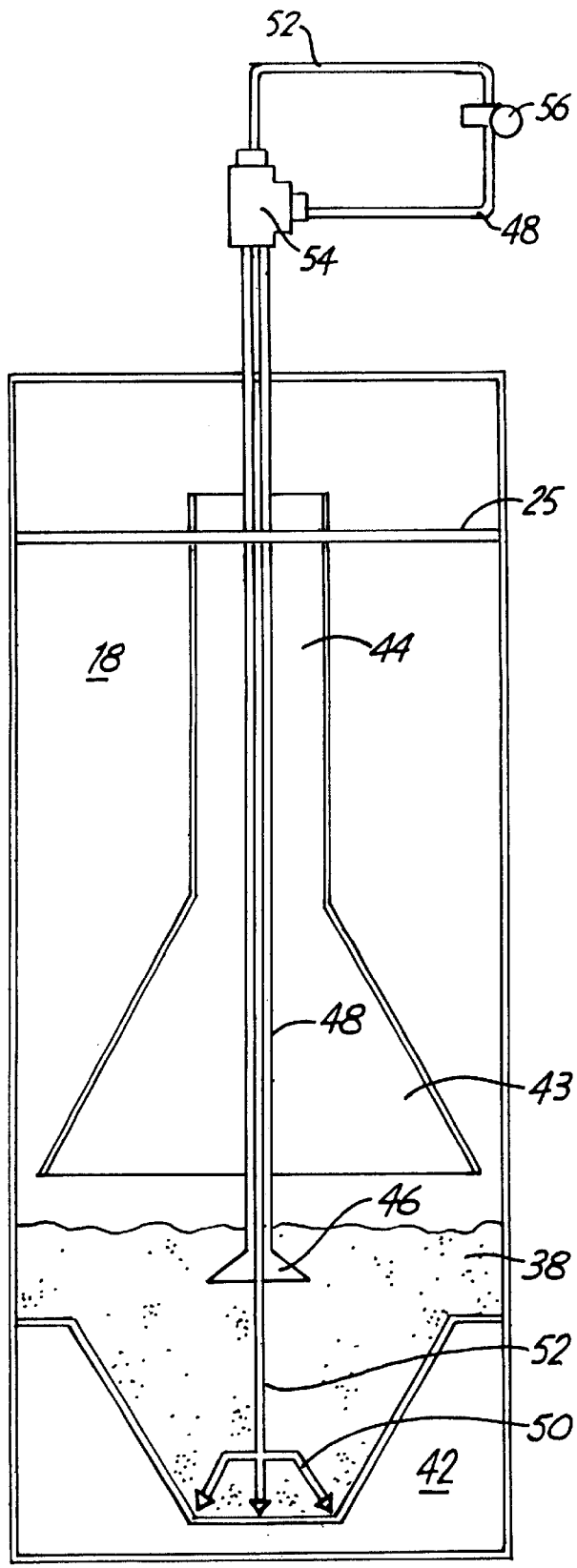
FIG. 6 is an enlarged sectional elevation view of a suspended micromedia compartment of a preferred embodiment of the wastewater treatment system of the present invention, taken from the perspective of FIG. 2.

FIG. 6 is an enlarged sectional elevation view of a suspended micromedia compartment 18 of a preferred embodiment of the wastewater treatment system 8 of the present invention, taken from the perspective of FIG. 2. FIG. 6 shows, in further detail, aeration diffuser 46, aeration air line 48, cleaning nozzle assembly 50, cleaning air line 52, diversion valve 54, and a schematic rendering of compressor 56. In a preferred embodiment, cleaning air line 52 is disposed interior to aeration air line 48. During water treatment, air from compressor 56 is routed by diversion valve 54 through aeration air line 48, outside of cleaning air line 52, to aeration diffuser 46.

During periods when water is not being treated, separating media 38 may be cleaned using nozzle assembly 50 at the bottom of suspended micromedia compartment 18. Diversion valve 54 maybe used to direct air from compressor 56 from aeration air line 48 to cleaning air line 52 and nozzle assembly 50. Air flowing through nozzle assembly 50 fluidizes separating media 38, thereby allowing for the dislodgement of filtered particles. The particles will then be collected by inverted cone 43, flow up chimney 44, onto tray 25, and back into aerobic treatment compartment 14. In aerobic treatment zone 14, the particles can undergo further digestion by the microorganisms, eventually settling to underdrain zone 40 for later removal.

Such cleaning of separating media 38 is preferably accomplished during periods of low or no flow to reduce the introduction of particles into discharge compartment 20. A timer circuit may be used with an electrically operated diversion valve 54 to automate the cleaning process. When the periodic cleaning process if completed, diversion valve 54 redirects air from compressor 56 to aeration air line 48 for normal operation.

Figure 7:
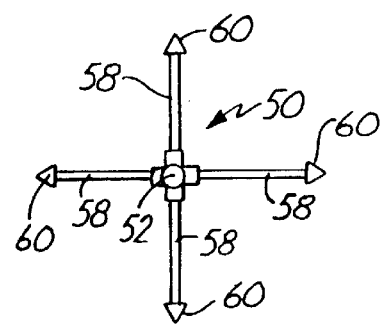
FIG. 7 is a top view of a cleaning nozzle assembly of a preferred embodiment of the wastewater treatment system of the present invention.

FIG. 7 is a top view of a cleaning nozzle assembly 50. Cleaning nozzle assembly 50, connected to cleaning air line 52, includes a plurality of nozzles 58 capped by corresponding diffusers 60. This particular configuration off our nozzles 58 and diffusers 60 has been found to successfully fluidize separating media 38. However, nozzle assembly 50 may comprise any number and configuration of nozzles and diffusers. The primary consideration in choosing a particular design is the ability of the chosen nozzle assembly to fluidize all of separating media 38.

Figure 8:
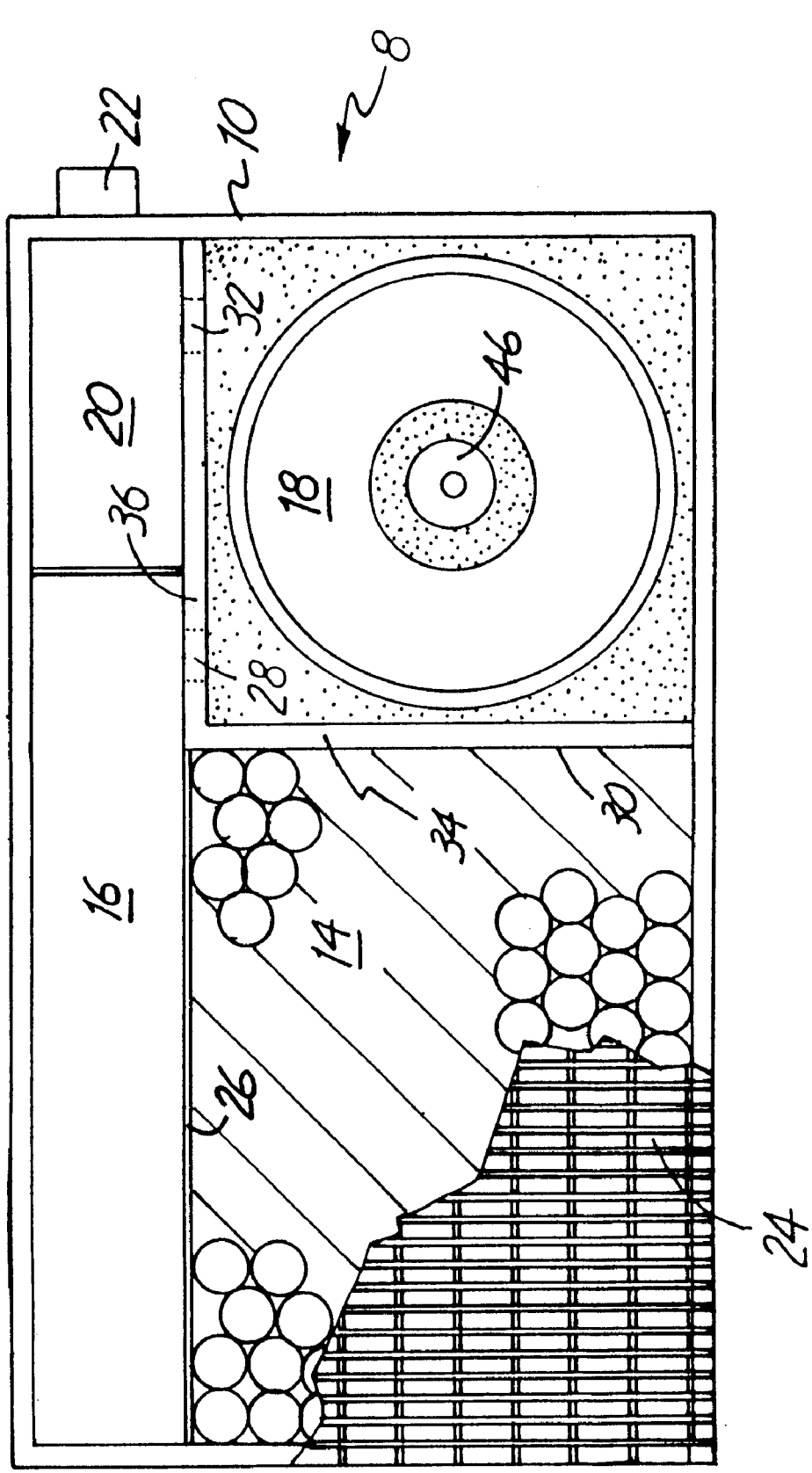
FIG. 8 is a top sectional view of a second preferred embodiment of the wastewater treatment system of the present invention, taken from the same perspective as FIG. 3.

FIG. 8 is a top sectional view of a second preferred embodiment of the wastewater treatment system 8 of the present invention, taken from the same perspective as FIG. 3. In this embodiment, anoxic compartment 16 is expanded to offer a larger compartment for anoxic activity. An expanded anoxic compartment would be used when a higher retention time in anoxic treatment compartment 16 is required to achieve an anoxic condition, preferably where the oxygen content is less than two percent.

Figure 9:
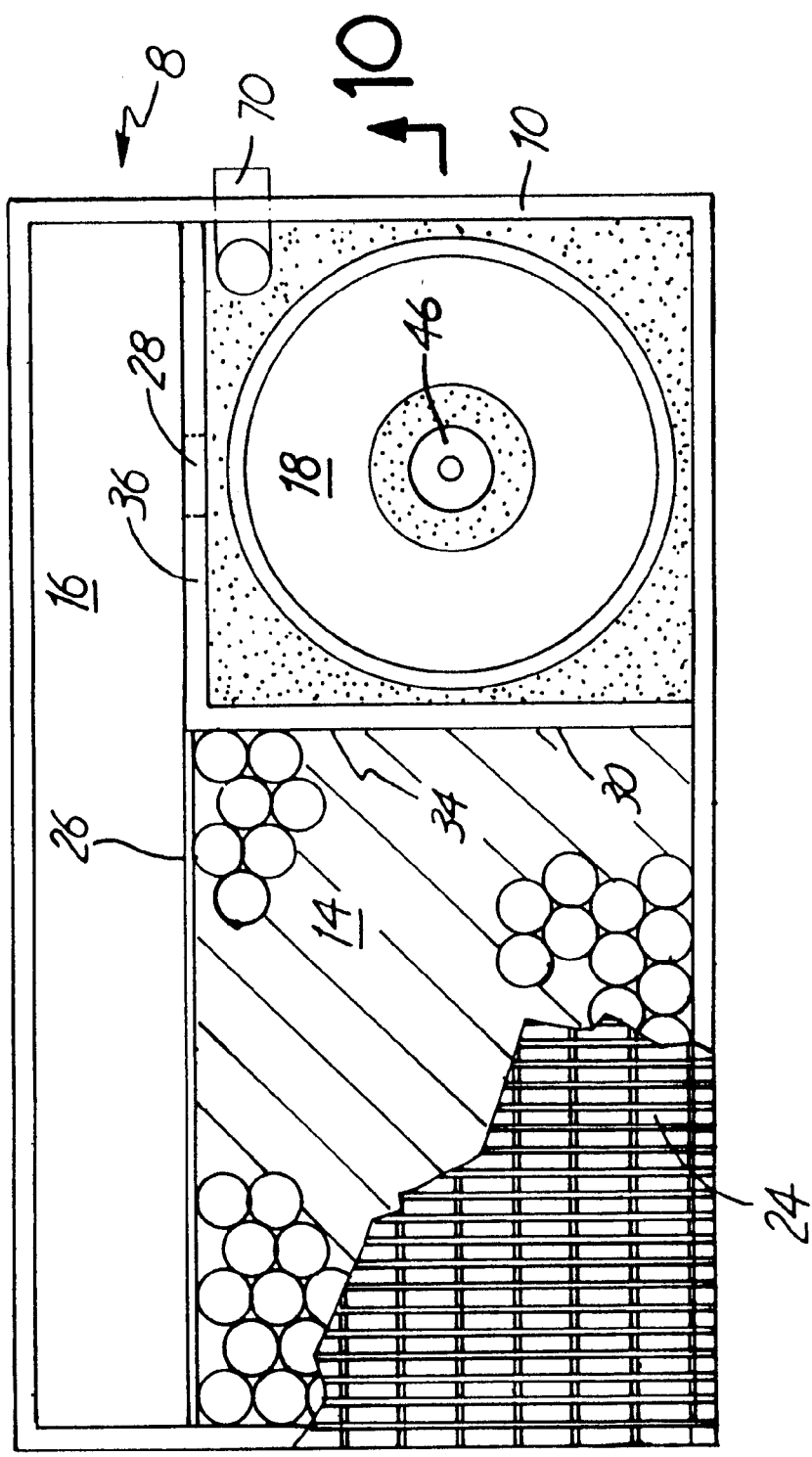
FIG. 9 is a top sectional view of a third preferred embodiment of the wastewater treatment system of the present invention, taken from the same perspective as FIG. 3.
Figure 10:
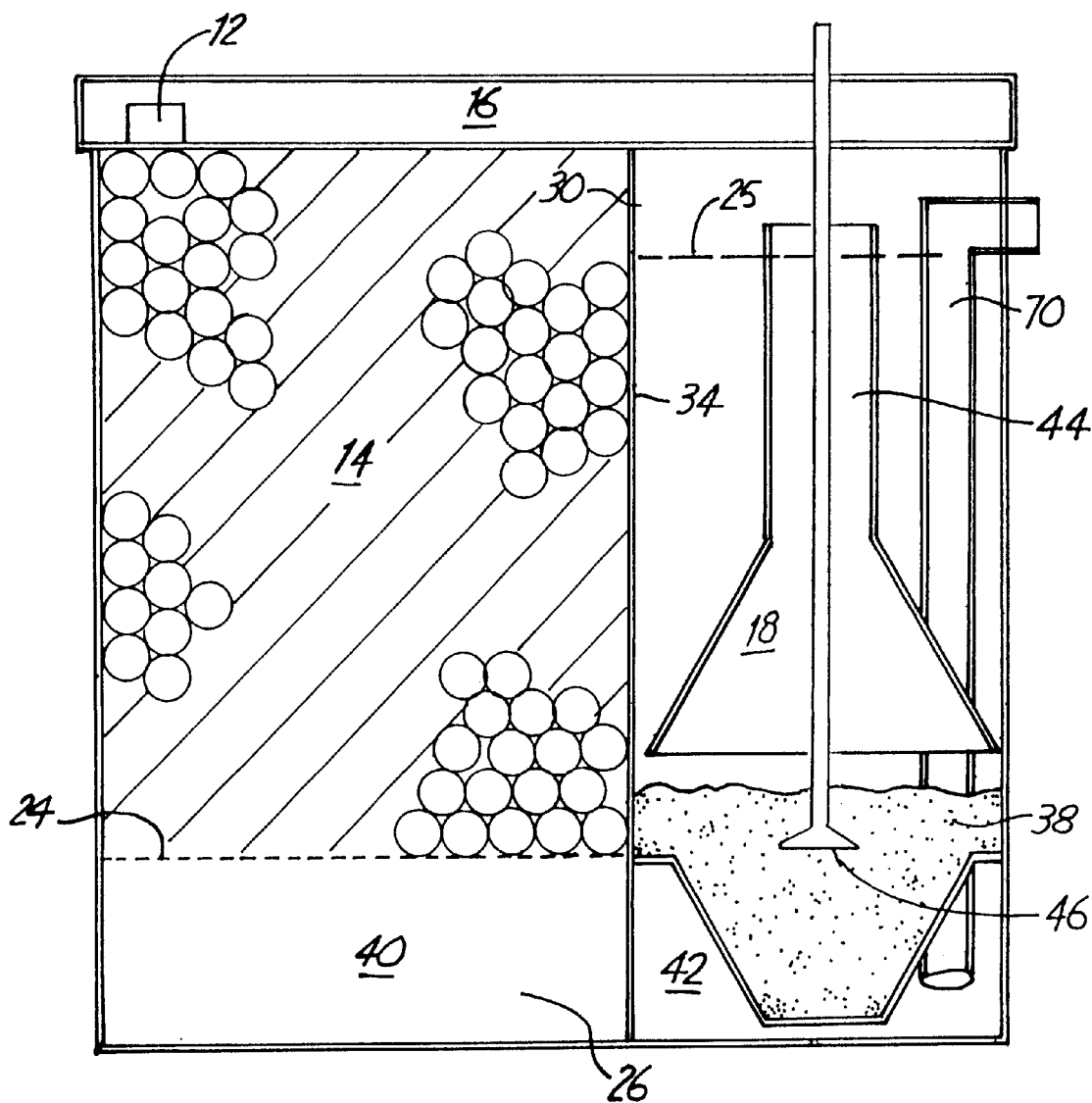
FIG. 10 is a sectional elevation view of the third preferred embodiment, taken along line 10—10 of FIG. 9.

FIGS. 9 and 10 show an embodiment in which discharge compartment 20 is replaced by a discharge well pump 70. FIG. 9 is a top sectional view of the third preferred embodiment of the wastewater treatment system of the present invention, taken from the same perspective as FIG. 3. FIG. 10 is a sectional elevation view of the third preferred embodiment, taken along line 10—10 of FIG. 9. FIGS. 9 and 10 show well pump 70 housed in suspended micromedia compartment 18. Pump 70 is situated so that clarified water is pumped directly out of tank 10 from underdrain zone 42. While a vertical well pump is shown, the same function may be accomplished by any water pump drawing fluid from underdrain zone 42. In an alternative embodiment, a tank outlet may be directly disposed in underdrain zone 42. Removing treated water directly from underdrain zone 42 allows for the elimination of discharge compartment 20. This permits for expansion of the other compartments without increased volume requirements, or for compaction of tank 10 without a reduction in processing capability.

As the above examples illustrate, the principles of this invention may be accomplished by embodiments of varying design, with sizing of the various compartments of tank 10 adapted to the needs of a particular application. While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention.

What is claimed is:

1. A compact nitrogen reduction wastewater treatment system for treating a waste liquid, the system comprising a single tank, the tank comprising:

a tank inlet;
   an aerobic treatment compartment including aerobic treatment bacteria, the aerobic treatment compartment being in fluid communication with the tank inlet;
   an anoxic treatment compartment laterally disposed relative to the aerobic treatment compartment and in fluid communication with the aerobic treatment compartment;
   a suspended micromedia compartment including separating media, the suspended micromedia compartment positioned laterally relative to the anoxic treatment compartment and in fluid communication with the anoxic treatment compartment; the suspended micromedia compartment further being laterally disposed relative to the aerobic treatment compartment and in fluid communication with the aerobic treatment compartment;
   an aerator for injecting air bubbles into the suspended micromedia compartment, thereby causing at least some of the waste liquid to flow to the aerobic treatment compartment;
   a media retaining mechanism for retaining the separating media and allowing the passage of at least a portion of the waste liquids; and
   a tank outlet.

2. The wastewater treatment system of claim 1 further comprising a discharge compartment in fluid communication with the suspended micromedia compartment and the tank outlet.

3. The wastewater treatment system of claim 1 further comprising:
   fixed media in the aerobic treatment compartment, the fixed media supporting the aerobic treatment bacteria; and
   a floor supporting the fixed media, the floor being permeable by the waste liquid.

4. The wastewater treatment system of claim 1 further comprising a chimney providing fluid communication between the suspended micromedia compartment and the aerobic treatment compartment, the chimney located above and spaced vertically from the separating media.

5. The wastewater treatment system of claim 4 further comprising a tray which collects waste liquid flowing up through the chimney and directs the liquid to the aerobic treatment compartment.

6. The wastewater treatment system of claim 1 further comprising an underdrain zone beneath the separating media of the suspended micromedia compartment.

7. The wastewater treatment system of claim 6 wherein the tank outlet comprises a discharge pump in fluid communication with the underdrain zone of the suspended media compartment.

8. The wastewater treatment system of claim 1 in which the aerator includes an air compressor, the compressor also providing a vacuum to the anoxic treatment compartment.

9. The wastewater treatment system of claim 1 in which the aerator comprises a diffuser connected to a first air line, the first air line being attached to a compressor, the diffuser located within the suspended micromedia compartment.

10. The wastewater treatment system of claim 9 further comprising:
    a second air line attached to the compressor; and
    a nozzle assembly attached to the second air line, the nozzle assembly directing air from the compressor into the separating media for fluidizing the separating media.

11. The wastewater treatment system of claim 10 further comprising a diversion valve for directing air from the compressor alternately between the first air line and the second air line.

12. The wastewater treatment system of claim 11 wherein the diversion valve is controlled by a timer.

13. A method for nitrogen reduction in a waste liquid, the method comprising:
 (a) treating the waste liquid in an aerobic treatment compartment by action of aerobic treatment bacteria;
 (b) treating the waste liquid in an anoxic treatment compartment in fluid communication with the aerobic treatment compartment;
 (c) aerating the waste liquid with air in a suspended micromedia compartment including separating media, the suspended micromedia compartment in fluid communication with the anoxic treatment compartment and the aerobic treatment compartment;
 (d) returning a major portion of the waste liquid to the aerobic treatment compartment;
 (e) filtering a minor portion of the waste liquid through the separating media, thereby producing a treated liquid;
 (f) introducing untreated waste liquid to the aerobic treatment compartment;
 (g) treating the untreated waste liquid and the returned waste liquid in an aerobic treatment compartment by action of aerobic treatment bacteria;
 (h) repeating steps (b) through (g) a plurality of times; and
 (i) removing the treated liquid.

14. The method of claim 13 further comprising heating the air used in step (c).

15. A compact nitrogen reduction wastewater treatment system for treating a waste liquid, the system comprising a single tank, the tank comprising:
 a tank inlet;
 an aerobic treatment compartment including aerobic treatment bacteria, the aerobic treatment compartment being in fluid communication with the tank inlet;
 fixed media in the aerobic treatment compartment, the fixed media supporting the aerobic treatment bacteria;
 a floor supporting the fixed media, the floor being permeable by the waste liquid;
 an anoxic treatment compartment laterally disposed relative to the aerobic treatment compartment and in fluid communication with the aerobic treatment compartment;
 a suspended micromedia compartment including separating media, the suspended micromedia compartment positioned laterally relative to the anoxic treatment compartment and in fluid communication with the anoxic treatment compartment; the suspended micromedia compartment further being laterally disposed relative to the aerobic treatment compartment and in fluid communication with the aerobic treatment compartment;
 an air compressor for aerating the suspended micromedia compartment wherein a plurality of air bubbles are injected through an air line, through a diffuser, and into the suspended micromedia compartment, thereby causing at least some of the waste liquid to flow to the aerobic treatment compartment;
 a media retaining mechanism for retaining the separating media and allowing the passage of at least a portion of the waste liquids;
 a chimney providing fluid communication between the suspended micromedia compartment and the aerobic treatment compartment, the chimney located above and spaced vertically from the separating media;
 an underdrain zone beneath the separating media of the suspended micromedia compartment;
 a discharge compartment in fluid communication with the suspended micromedia compartment and the tank outlet; and
 a tank outlet.

* * * * *